US010779456B2

(12) United States Patent
Kowalchuk

(10) Patent No.: US 10,779,456 B2
(45) Date of Patent: Sep. 22, 2020

(54) SYSTEM AND RELATED METHODS FOR ADJUSTING DOWN PRESSURE LOADS ON A DISC OPENER OF A SEEDER

(71) Applicant: CNH Industrial Canada, Ltd., Saskatoon (CA)

(72) Inventor: Trevor L. Kowalchuk, Saskatchewan (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 255 days.

(21) Appl. No.: 15/935,167

(22) Filed: Mar. 26, 2018

(65) Prior Publication Data

US 2019/0289768 A1 Sep. 26, 2019

(51) Int. Cl.
| | |
|---|---|
| *A01B 63/00* | (2006.01) |
| *A01B 63/28* | (2006.01) |
| *A01C 5/06* | (2006.01) |
| *A01C 7/20* | (2006.01) |

(52) U.S. Cl.
CPC ............ *A01B 63/28* (2013.01); *A01B 63/008* (2013.01); *A01C 5/064* (2013.01); *A01C 7/205* (2013.01)

(58) Field of Classification Search
CPC ... A01B 63/002; A01B 63/008; A01B 63/111; A01B 63/16; A01C 7/203; A01C 7/205
USPC .......................................................... 172/4
See application file for complete search history.

(56) References Cited

U.S. PATENT DOCUMENTS

| | | | |
|---|---|---|---|
| 4,176,721 A | 12/1979 | Poggemiller et al. | |
| 4,355,688 A | 10/1982 | Hamm et al. | |
| 4,385,353 A | 5/1983 | Schneider | |
| 4,913,070 A | 4/1990 | Morrison, Jr. | |
| 5,234,060 A | 8/1993 | Carter | |
| 5,562,165 A | 10/1996 | Janelle et al. | |
| 5,709,271 A | 1/1998 | Bassett | |
| 6,389,999 B1 | 5/2002 | Duello | |
| 6,701,857 B1 | 3/2004 | Jensen et al. | |
| 6,827,029 B1 | 12/2004 | Wendte | |
| 7,360,495 B1 | 4/2008 | Martin | |
| 8,275,525 B2 | 9/2012 | Kowalchuk et al. | |
| 8,448,586 B2* | 5/2013 | Schilling ................ | A01C 5/064 111/186 |
| 8,464,649 B2* | 6/2013 | Schilling ................ | A01C 5/064 111/186 |
| 8,479,670 B2* | 7/2013 | Schilling ................ | A01C 7/205 111/163 |
| 9,095,088 B2* | 8/2015 | Schilling ................ | A01C 5/068 |

(Continued)

*Primary Examiner* — Gary S Hartmann
(74) *Attorney, Agent, or Firm* — Rebecca L. Henkel; Rickard K. DeMille

(57) ABSTRACT

A system for adjusting down pressure loads on a disc opener of a seeder includes a depth adjustment assembly having a gauge wheel and a gauge wheel arm coupled between the disc opener and the gauge wheel. An actuator is configured to apply a down pressure load on the disc opener. Moreover, the system may include a sensor provided in operative association with the gauge wheel or a component coupled between the gauge wheel and the gauge wheel arm. The sensor may be configured to detect a parameter indicative of the down pressure load applied on the disc opener. Additionally, a controller of the system may be configured to control an operation of the actuator based on measurement signals received from the sensor to regulate the down pressure load applied on the disc opener.

19 Claims, 9 Drawing Sheets

(56) References Cited

U.S. PATENT DOCUMENTS

| | | | | |
|---|---|---|---|---|
| 9,307,688 | B2* | 4/2016 | Adams | A01B 33/087 |
| 9,955,622 | B2* | 5/2018 | Gadzella | A01C 7/205 |
| 9,968,030 | B2* | 5/2018 | Kowalchuk | A01C 7/205 |
| 10,470,360 | B2* | 11/2019 | Kowalchuk | A01C 7/205 |
| 2011/0313575 | A1* | 12/2011 | Kowalchuk | A01C 7/205 700/282 |
| 2013/0228108 | A1* | 9/2013 | Schilling | A01C 5/064 111/154 |
| 2013/0255552 | A1* | 10/2013 | Schilling | A01C 5/064 111/71 |
| 2013/0255553 | A1* | 10/2013 | Schilling | A01C 5/064 111/186 |
| 2018/0199501 | A1* | 7/2018 | Gadzella | A01C 7/205 |
| 2018/0317381 | A1* | 11/2018 | Bassett | A01B 79/005 |
| 2019/0045703 | A1* | 2/2019 | Bassett | A01C 5/066 |
| 2019/0327882 | A1* | 10/2019 | Kowalchuk | A01C 7/205 |
| 2020/0029493 | A1* | 1/2020 | Naylor | A01C 7/203 |

* cited by examiner

SYSTEM AND RELATED METHODS FOR ADJUSTING DOWN PRESSURE LOADS ON A DISC OPENER OF A SEEDER

FIELD

The present disclosure generally relates to seeders and, more particularly, to systems and methods for adjusting down pressure loads on a disc opener of a seeder to maintain a constant furrow depth.

BACKGROUND

Modern farming practices strive to increase yields of agricultural fields. In this respect, seeders and other agricultural implements are towed behind a tractor or other work vehicle to deposit seeds in a field. For example, seeders typically include one or more disc openers that form a furrow or trench in the soil. One or more dispensing devices of the seeder may, in turn, deposit seeds into the furrow(s). After deposition of the seeds, a packer wheel may pack the soil on top of the deposited seeds.

Seeders typically include a gauge wheel that controls the depth of the furrow(s). In this regard, the position of the gauge wheel may be moved relative to a frame member of the seeder, such as by moving an arm between various depth setting positions, to adjust the depth of the furrow(s). Additionally, the seeder includes an actuator configured to exert a down pressure load on the disc opener(s) to ensure that the disc opener(s) are able to penetrate the soil to the depth set by the gauge wheel. However, many operators are unsure of the necessary amount of down pressure. As such, these operators generally operate the seeder with the actuator exerting the maximum amount of down pressure on the disc opener(s) in order to ensure the disc opener(s) are penetrating the soil to the desired depth. Frequent operation of the seeder with maximum down pressure applied to the disc opener(s) results in increased wear on the various components of the seeder.

Accordingly, an improved system and related methods for adjusting down pressure loads on a disc opener of a seeder would be welcomed in the technology.

BRIEF DESCRIPTION

Aspects and advantages of the technology will be set forth in part in the following description, or may be obvious from the description, or may be learned through practice of the technology.

In one aspect, the present subject matter is directed to a system for adjusting down pressure loads on a disc opener of a seeder. The system may include a frame member (also referred to as a backbone) and a disc opener supported on the frame member for rotation relative thereto, with the disc opener being configured to penetrate the ground to form a furrow. The system may also include a depth adjustment assembly having a gauge wheel and a gauge wheel arm coupled between the disc opener and the gauge wheel. The depth adjustment assembly may be configured to control a penetration depth of the disc opener. Furthermore, the system may include an actuator configured to apply a down pressure load on the disc opener. Moreover, the system may include a sensor provided in operative association with the gauge wheel or a component coupled between the gauge wheel and the gauge wheel arm. The sensor may be configured to detect a parameter indicative of the down pressure load applied on the disc opener. Additionally, the system may include a controller communicatively coupled to the sensor, with the controller being configured to control an operation of the actuator based on measurement signals received from the sensor to regulate the down pressure load applied on the disc opener.

In another aspect, the present subject matter is directed to a system for adjusting down pressure loads on a disc opener of a seeder. The system may include a frame member and a disc opener supported on the frame member for rotation relative thereto, with the disc opener being configured to penetrate the ground to form a furrow. The system may also include a depth adjustment assembly configured to control a penetration depth of the disc opener. The depth adjustment assembly may include a gauge wheel and a depth control arm coupled to the gauge wheel, with the depth adjustment arm being moveable relative to the frame member. The system may further include an actuator configured to apply a down pressure load on the disc opener. Moreover, the system may include a sensor provided in operative association with the frame member, with the sensor being configured to detect a parameter indicative of the down pressure load applied on the disc opener. Additionally, the system may include a controller communicatively coupled to the sensor. The controller may be configured to control an operation of the actuator based on measurement signals received from the sensor to regulate the down pressure load applied on the disc opener.

In a further aspect, the present subject matter is directed to a seeder. The seeder may include a toolbar, a rockshaft moveable relative to the toolbar, and an actuator coupled between the toolbar and the rockshaft. The actuator may include configured to move the rockshaft relative to the toolbar. The seeder may also include a plurality of disc opener units adjustably coupled to the toolbar and the rockshaft. Each disc opener unit may include a frame member coupled to the toolbar and the rockshaft and a disc opener supported on the frame member for rotation relative thereto, with the disc opener being configured to penetrate the ground to form a furrow. Each disc opener unit may also include a depth adjustment assembly having a gauge wheel and a gauge wheel arm coupled between the disc opener and the gauge wheel, with the depth adjustment being configured to control a penetration depth of the disc opener. The seeder may further include a plurality of sensors, with each sensor being provided in operative association with at least one of the frame member, the gauge wheel, or a component coupled between the gauge wheel and the gauge wheel arm of one of the disc opener units. Each sensor may be configured to detect a parameter indicative of the down pressure load applied to the corresponding disc opener. Additionally, the seeder may include a controller communicatively coupled to the plurality of sensors. The controller may be configured to control an operation of the actuator based on measurement signals received from the plurality of sensors to adjust the position of the rockshaft relative to the toolbar to regulate the down pressure load being applied on the disc opener of each disc opener unit.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
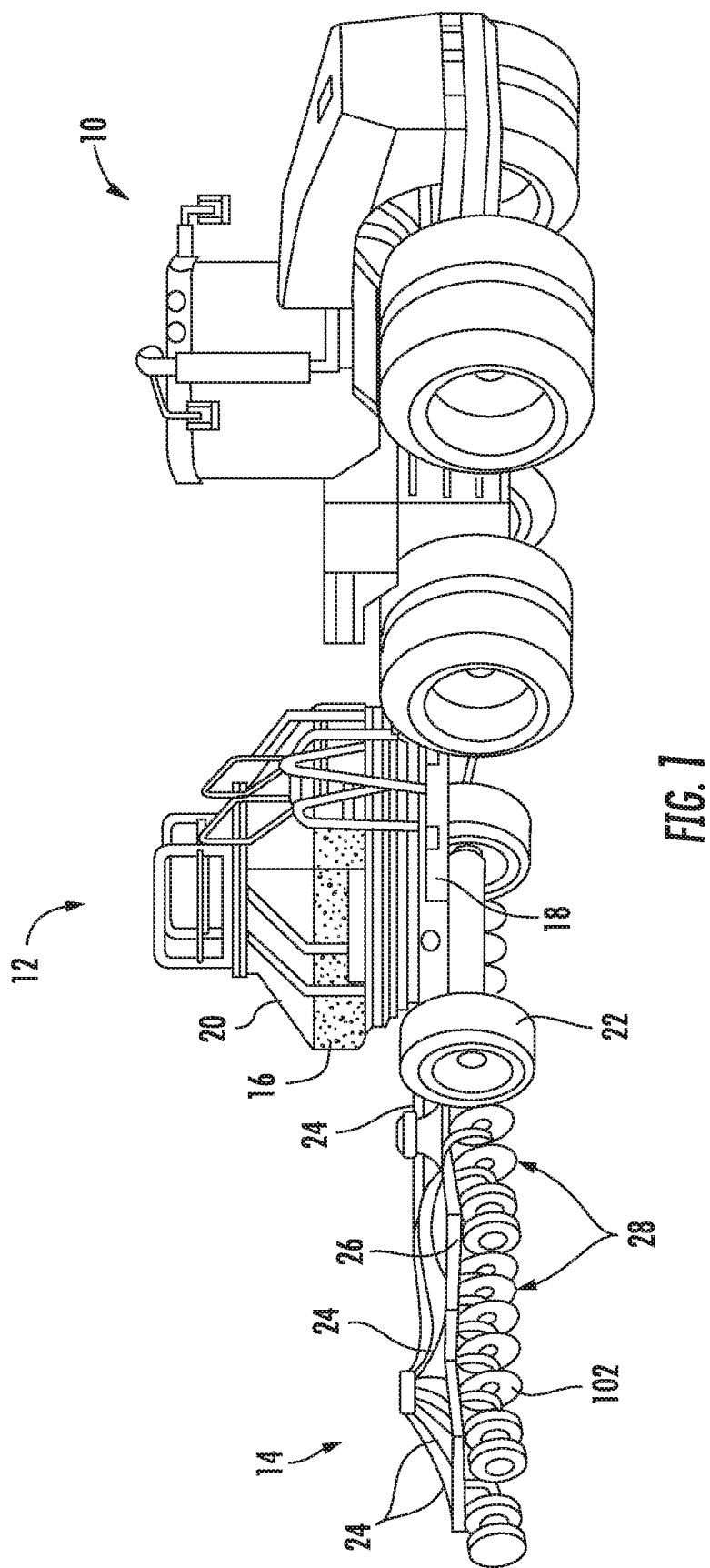
FIG. 1 illustrates a perspective view of one embodiment of a work vehicle, an air cart, and an seeder in accordance with aspects of the present subject matter.

Repeat use of reference characters in the present specification and drawings is intended to represent the same or analogous features or elements of the present technology.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and related methods for adjusting down pressure loads on a disc opener(s) of a seeder. The seeder may be configured, for example, to include a plurality of disc opener units ganged together via an associated toolbar and rockshaft of the seeder. Additionally, in several embodiments, the system may include one or more disc openers configured to penetrate the ground to form a furrow or trench for the deposition of seeds therein, with each disc opener being coupled to a frame member or backbone of an associated disc opener unit of the seeder. The system may also include a depth adjustment assembly provided in operative association with each disc opener unit that is configured to control a penetration depth of the disc opener(s) and an actuator configured to apply a down pressure load on the ganged disc openers to ensure that each disc opener penetrates the ground to the desired depth set by the depth control assembly. Furthermore, the system may include one or more sensors configured to detect a parameter indicative of the down pressure load applied on the disc opener(s). Based on measurement signals received from the sensor(s), a controller of the system may be configured to control the operation of the actuator to regulate the down pressure load applied on the disc opener(s), thereby allowing the depth of the furrow or trench being formed to remain substantially constant as the seeder is towed across a field.

In accordance with aspects of the present disclosure, the sensor(s) may be provided in operative association with various components of the seeder to permit detection of the parameter indicative of the down pressure load applied on the disc opener(s). More specifically, in one embodiment, the sensor(s) may be provided in operative association with the frame member or backbone of one or more of the disc opener units, such as positioned between the frame member and a depth adjustment arm of each disc opener unit. In another embodiment, the sensor(s) may be provided in operative association with a gauge wheel of the depth adjustment assembly. In a further embodiment, the sensor(s) may be provided in operative association with a component coupled between the gauge wheel and a gauge wheel arm of the depth adjustment assembly. For example, in such an embodiment, the sensor(s) may be provided in operative association with a gauge wheel bearing associated with the gauge wheel, a gauge wheel shaft coupled between the gauge wheel and the gauge wheel arm, and/or a fastener coupling the gauge wheel to the gauge wheel arm.

Referring now to drawings, FIG. 1 illustrates a perspective view of the work vehicle 10, the air cart 12, and one embodiment of the seeder 14. It should be appreciated that, although the work vehicle 10 illustrated herein is configured as a tractor, the work vehicle 10 may generally be configured as any suitable work vehicle known in the art, such as any other agricultural vehicle, and/or the like. It should also be appreciated that, although the implement 14 illustrated herein corresponds to a seed disc drill, the implement 14 may generally correspond to any suitable equipment or implement, such as seed hoe drill or another seed dispensing implement, a fertilizer dispensing implement, and/or the like.

As shown, the air cart 12 may be configured to be towed directly behind the work vehicle 10, with the seeder 14 being towed behind the air cart 12. In this regard, a hitch assembly (not shown) may be configured to couple the air cart 12 to the work vehicle 10. Furthermore, another hitch assembly (not shown) may be configured to couple the seeder 14 to the air cart 12. However, in an alternative embodiment, the seeder 14 may be towed directly behind the work vehicle 10, with the air cart 12 being towed behind the seeder 14. In a further embodiment, the air cart 12 and the seeder 14 may be part of a single unit that is towed behind the work vehicle 10, or elements of a self-propelled vehicle configured to distribute agricultural product across a field.

In accordance with aspects of the present disclosure, the air cart 12 may be configured to store a flowable granular or particulate-type agricultural product 16, such as seeds, fertilizer, and/or the like, to be deposited within the soil. Specifically, in several embodiments, the air cart 12 may include a frame 18 configured to support or couple to various components of the air cart 12. For example, as shown, the frame 18 may be configured to support a hopper or storage tank 20 configured for storing the agricultural product 16 to be deposited within the furrow. Furthermore, in one embodiment, a plurality of wheels 22 may be coupled to the frame 18 to permit the air cart 12 to be towed across a field by the work vehicle 10. Additionally, a plurality of delivery conduits 24 may be configured to convey the agricultural product 16 from the air cart 12 to the seeder 14 for deposition into the furrow.

In several embodiments, the seeder 14 may include a toolbar 26 configured to support or couple to various components of the seeder 14, such as one or more disc opener units 28. As will be described below, each disc opener unit 28 may include one or more disc openers 102 configured to excavate a furrow or trench in soil to facilitate deposition of a flowable granular or particulate-type agricultural product 16. It should be appreciated that the seeder 14 may generally include any number of disc opener units 28 to facilitate delivery of the agricultural product 16 across a given swath of the soil. For instance, in one embodiment, the implement 14 may include twenty-four disc opener units 28 spaced apart across the width of the seeder 14. In alternative embodiments, however, the seeder 14 may include any other suitable number of disc opener units 28, such as less than twenty-four disc opener units 28 or more than twenty-four disc opener units 28.

Figure 2:
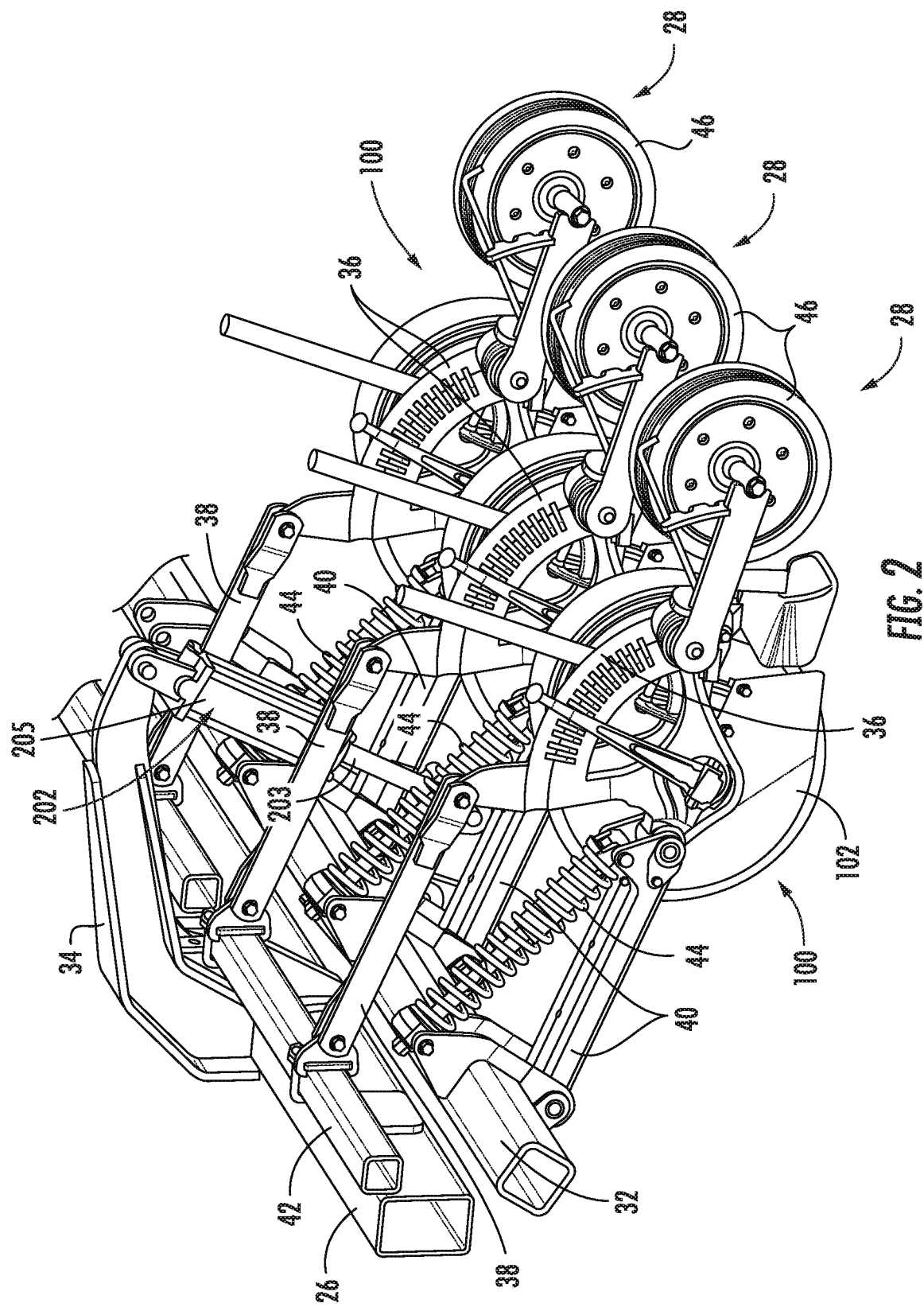
FIG. 2 illustrates an enlarged, partial perspective view of one embodiment of the seeder shown in FIG. 1, particularly illustrating a plurality of disc opener units coupled to a toolbar and a rockshaft of the seeder with a spring coupled between disc opener unit and the rockshaft in accordance with aspects of the present subject matter.

Referring now to FIG. 2, an enlarged, perspective view of a portion of the seeder 14 shown in FIG. 1 is illustrated in accordance with aspects of the present subject matter. As shown, the seeder 14 may include a rockshaft 32 that is moveable relative to the toolbar 26. In this regard, the seeder 14 may include an actuator 202 (e.g., a rockshaft cylinder) configured to rotate or otherwise move the rockshaft 32 relative to the toolbar 26. For example, as shown in the illustrated embodiment, a first end of the actuator 202 (e.g., a rod 203 of the actuator 202) may be coupled to the rockshaft 32, while a second end of the actuator 202 (e.g., a cylinder 205 of the actuator 202) may be coupled to a support arm 34 of the seeder 14, which is, in turn, mounted to the toolbar 26. As will be described below, the rod 203 of the actuator 202 may be configured to extend and/or retract relative to the cylinder 205 of the actuator 202 to rotate the rockshaft 32 relative to the toolbar 26, which, in turn, adjusts a down force being applied to the various disc opener units 28 ganged together via the rockshaft 32. In the illustrated embodiment, the actuator 202 corresponds to a fluid-driven actuator, such as a hydraulic or pneumatic cylinder. However, it should be appreciated that the actuator 202 may correspond to any other suitable type of actuator, such as an electric linear actuator.

In several embodiments, a plurality of the disc opener units 28 of the seeder 14 may be ganged together on via the toolbar 26 and associated rockshaft 32, with each disc opener unit 28 including a frame member or backbone 36 adjustably coupled to the toolbar 26 and the rockshaft 32 by upper and lower links 38, 40. For example, one end of each upper link 38 may be pivotably coupled to the corresponding frame member 36 of the disc opener unit 28, while an opposed end of each upper link 38 may be pivotably coupled to a rail 42 of the seeder 14, which is, in turn, mounted to the toolbar 26. Similarly, one end of each lower link 40 may be pivotably coupled to the corresponding frame member 36, while an opposed end of each lower link 40 may be pivotably coupled to the rockshaft 32. In one embodiment, the upper and lower links 38, 40 may be parallel. In one embodiment, each lower link 40 may include a biasing member 44, such as the illustrated spring, coupled between the corresponding frame member 36 and the rockshaft 32 to apply a down force or pressure through the frame member 36 and the various components coupled thereto. However, it should be appreciated that, in alternative embodiments, each disc opener unit 28 may be coupled to the toolbar 26 and/or the rockshaft 32 in any other suitable manner. For example, the upper and/or lower links 38, 40 may be fixedly coupled to the frame member 36 and/or the links 38, 40 may be non-parallel. Additionally, in further embodiment, the seeder 14 may not include the upper and/or lower links 38, 40. In such instance, the seeder 14 may include other components for coupling each disc opener unit 28 to the toolbar 26 and/or the rockshaft 32.

As shown in FIG. 2, each disc opener unit 28 may also include a furrow opening assembly 100, a furrow closing assembly (not shown), and a press wheel 46. In general, each furrow opening assembly 100 may include the one or more disc openers 102 configured to excavate a furrow or trench in the soil for the deposition of seeds or other agricultural substances therein (e.g., fertilizer). The furrow closing assemblies are not shown to better illustrate the disc openers 102. As is generally understood, each furrow closing assembly may include a closing disc(s) configured to close the furrow after seeds have been deposited into the furrow. Each press wheel 46 may then be configured to roll over the corresponding closed furrow to firm the soil over the seeds and promote favorable seed-to-soil contact.

It should also be appreciated that the configuration of the seeder 14 described above and shown in FIGS. 1 and 2 is provided only to place the present subject matter in an exemplary field of use. Thus, it should be appreciated that the present subject matter may be readily adaptable to any manner of seeder configuration.

FIGS. 3 through 7 illustrate various views of one embodiment of a furrow opening assembly 100 in accordance with aspects of the present disclosure. In general, the furrow opening assembly 100 will be described herein with reference to the seeder 14 and associated disc opener units 28 described above with reference to FIGS. 1 and 2. However, it should be appreciated by those of ordinary skill in the art that the disclosed furrow opening assembly 100 may generally be utilized with seeders having any other suitable seeder configuration and/or disc opener units having any other suitable disc opener unit configuration.

Figure 3:
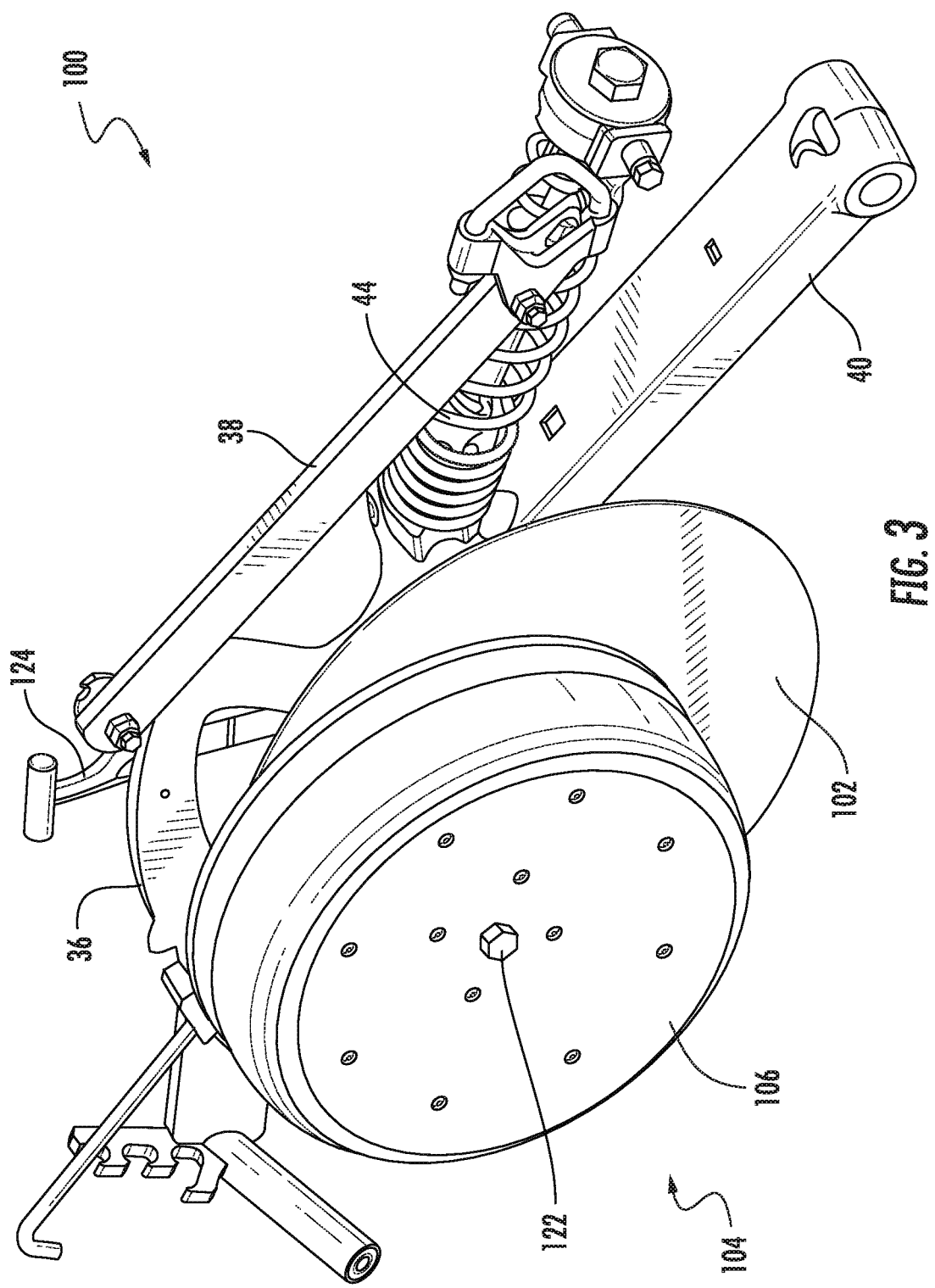
FIG. 3 illustrates a perspective view of one embodiment of a furrow opening assembly suitable for use with the seeder shown in FIGS. 1 and 2, particularly illustrating a gauge wheel in accordance with aspects of the present subject matter.
Figure 4:
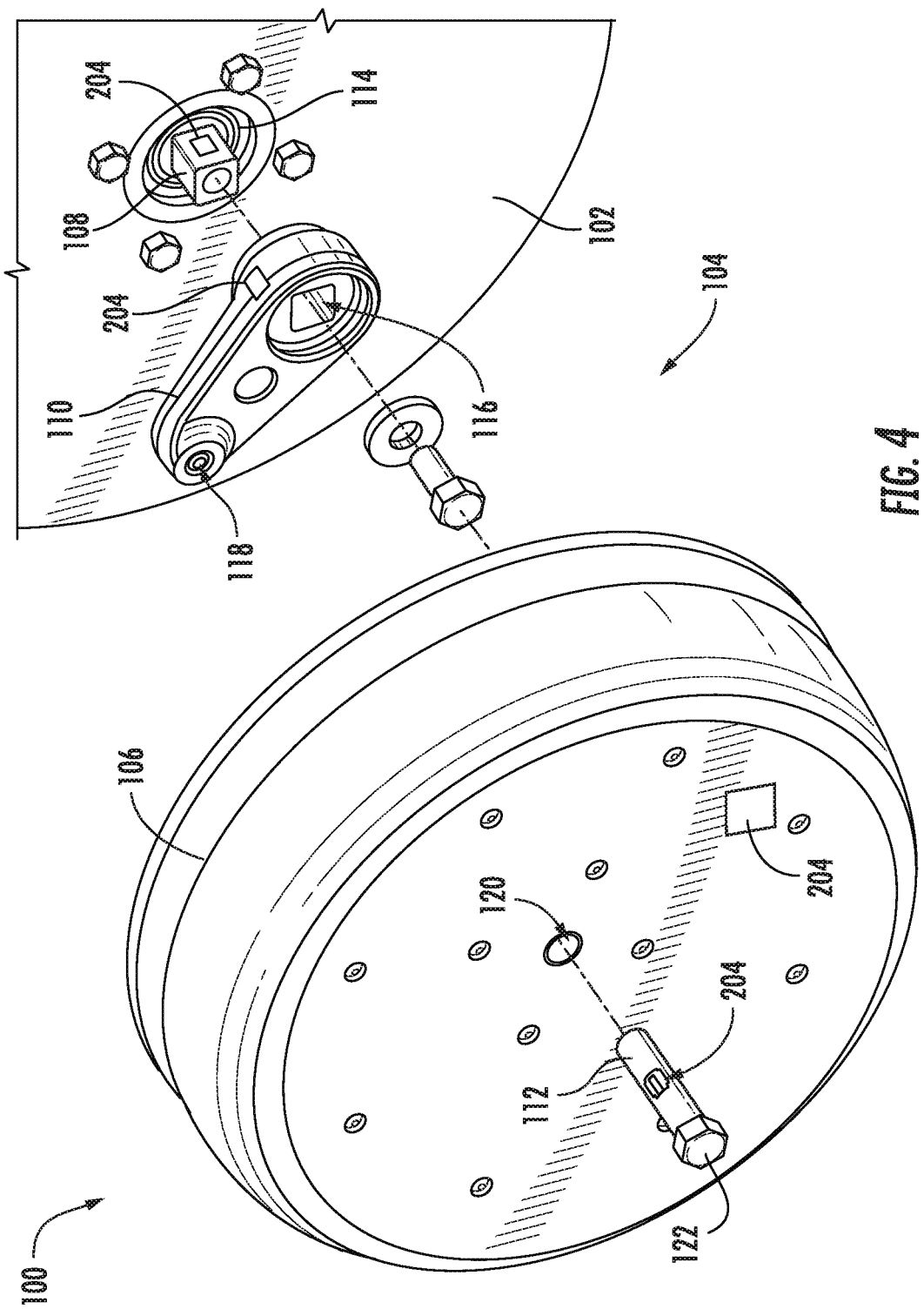
FIG. 4 illustrates an enlarged, partial exploded view of the furrow opening assembly shown in FIG. 3, particularly illustrating a gauge wheel arm configured to be coupled between the gauge wheel and a disc opener of the disc opener unit in accordance with aspects of the present subject matter.

Referring specifically to FIGS. 3 and 4, the furrow opening assembly 100 may include a depth adjustment assembly 104 configured to control the penetration depth of the disc opener(s) 102. Specifically, in several embodiments, the depth adjustment assembly 104 may include a gauge wheel 106 operably coupled to the disc opener(s) 102. As is generally understood, the gauge wheel 106 may be configured to roll along or otherwise engage the surface of the field as the seeder 14 is traveling across the field. As will be described below, the position of the gauge wheel 106 with respect to the disc opener(s) 102 may be adjusted to set the desired depth of the furrow being excavated.

For example, as shown, the depth adjustment assembly 104 may include a spindle 108, a gauge wheel arm 110, and a gauge wheel shaft 112 for operably coupling the gauge wheel 106 to the disc opener(s) 102. More specifically, the spindle 108 may extend through the disc opener(s) 102 along its rotational axis and may be coupled to or otherwise supported by the frame member 36 (e.g., by extending through an opening (not shown) defined through the frame member 36). As such, the disc opener(s) 102 is configured to rotate relative to the frame member 36 to permit formation of the furrow in the soil. In one embodiment, a disc opener bearing 114 may be coupled between the spindle 108 and the disc opener 102 to facilitate relative rotation therebetween. Furthermore, the gauge wheel arm 110 may define first and second apertures 116, 118, with each aperture 116, 118 being positioned proximate to opposed ends of the gauge wheel arm 110. As shown, a portion of the spindle 108 may be configured to be positioned within the first aperture 116 to couple the gauge wheel arm 110 to the spindle 108. Additionally, the gauge wheel 106 may be rotatably mounted on the gauge wheel shaft 112 for rotation relative to the gauge wheel arm 110 about a rotational axis offset from the rotational axis of the disc opener(s) 102. In such an embodiment, the gauge wheel shaft 112 may extend through a gauge wheel aperture 120 defined by the gauge wheel 106 and into the second aperture 118 of the gauge wheel arm 110, thereby coupling the gauge wheel 106 to the gauge wheel arm 110. In one embodiment, the gauge wheel shaft 112 may correspond to a suitable fastener 122, such as the illustrated bolt, that rotatably coupled the gauge wheel 106 to the gauge wheel arm 110.

Figure 5:
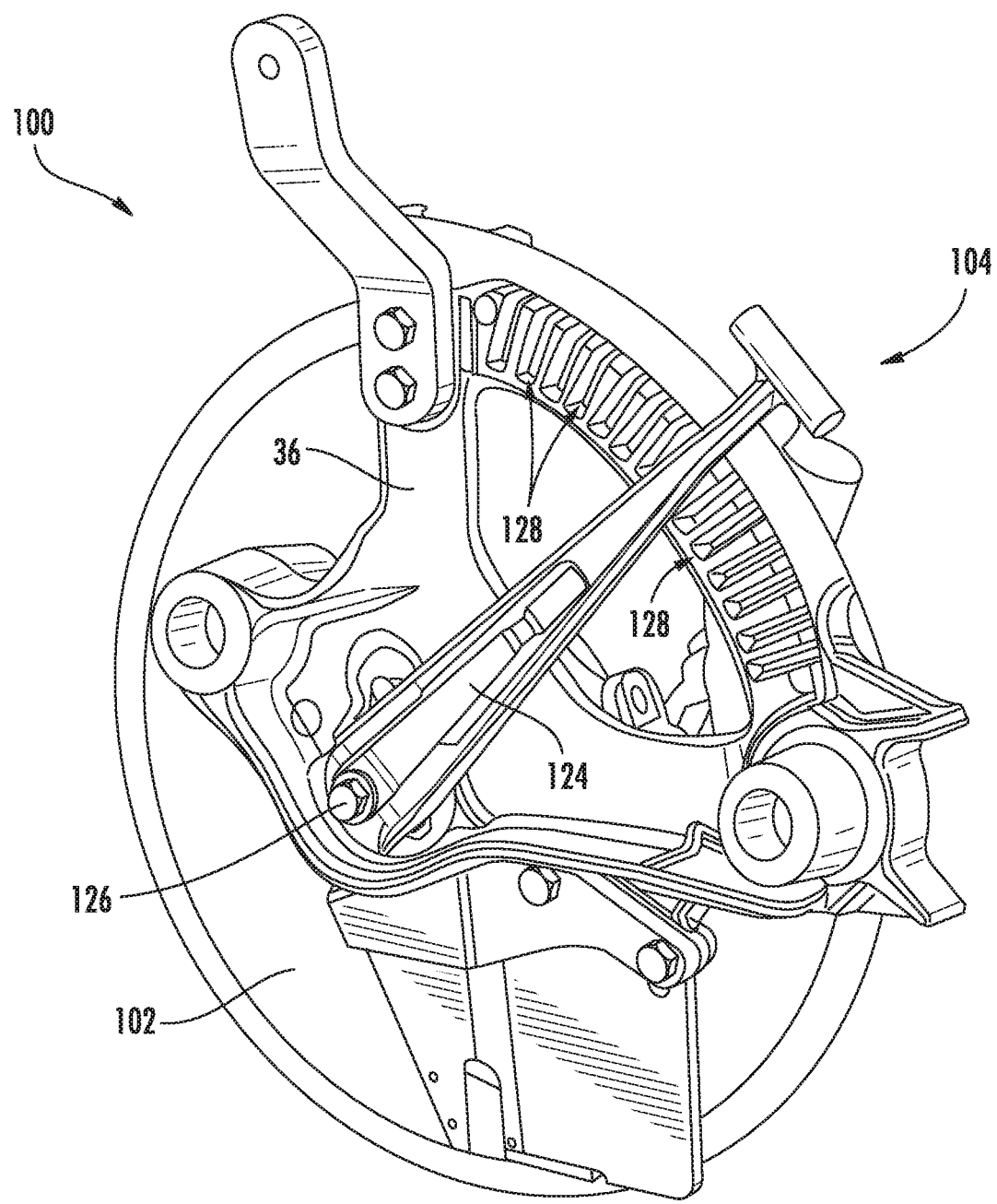
FIG. 5 illustrates another perspective view of the furrow opening assembly shown in FIGS. 3 and 4, particularly illustrating a depth control arm in accordance with aspects of the present subject matter.

Referring now to FIG. 5, the depth adjustment assembly 104 may further include a depth control arm 124 coupled to the spindle 108 along the opposed side of the disc opener(s) 102 as the gauge wheel 106 and associated gauge wheel arm 110. Specifically, in several embodiments, the depth control arm 124 may be coupled to one end of the spindle 108, while the gauge wheel arm 110 (FIG. 4) is coupled to an opposed end of the spindle 108. As such, in one embodiment, the depth control arm 124 may be positioned on one side of the frame member 36, while the disc opener(s) 102, the gauge wheel 106 (FIG. 4), and the gauge wheel arm 110 are positioned on an opposed side of the frame member 36. In several embodiments, movement of the depth control arm 124 relative to the frame member 36 may move the gauge wheel 106 relative to the disc opener(s) 102, thereby adjusting the depth to which the opener disk(s) 102 penetrate the soil. Specifically, movement of the depth control arm 124 relative to the frame member 36 may rotate the spindle 108 relative to the opener disk(s) 102. Such rotation of the spindle 108 may, in turn, rotate the gauge wheel arm 110, thereby increasing or decreasing the offset defined between the rotational axis of the gauge wheel 106 and the rotational axis of the disc opener(s) 102 such that the penetration depth of the disc opener(s) 102 is corresponding adjusted. For example, raising the position of the gauge wheel 106 relative to the disc opener(s) 102 (e.g., via rotation of the spindle 108 and gauge wheel arm 110 in one direction) may increase the cutting depth of the disc(s) 102, while lowering the position of the gauge wheel 106 relative to the disc opener(s) 102 (e.g., via rotation of the spindle 108 and gauge wheel arm 110 in the opposite direction) may reduce the cutting depth of the disc(s) 102. In the illustrated embodiment, the depth control arm 124 is coupled to the spindle 108 via a suitable fastener 126, such as the illustrated bolt. However, it should be appreciated that, in alternative embodiments, the depth control arm 124 may be coupled to the spindle 108 in any other suitable manner, such as via welding.

Figure 6:
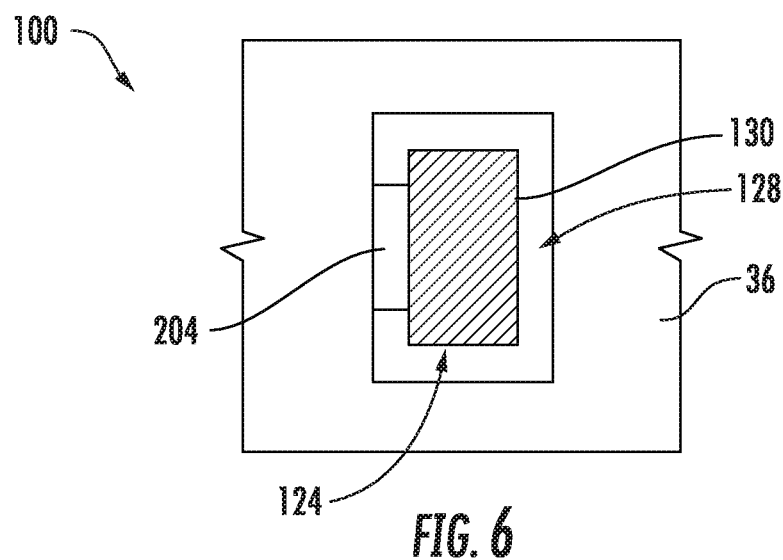
FIG. 6 illustrates an enlarged, partial side view of the furrow opening assembly shown in FIGS. 3 through 5, particularly illustrating a sensor provided in operative association with a frame member of the seeder in accordance with aspects of the present subject matter.

Moreover, in several embodiments, the frame member 36 may define a plurality of apertures or slots 128, with the apertures 128 being arranged such that each aperture 128 is associated with a predetermined penetration depth of the disc opener(s) 102. In this regard, as shown in FIG. 6, a portion of the depth control arm 124 (e.g., a tab 130 of the depth control arm 124) may be configured to engage or otherwise be positioned within one the apertures 128, thereby setting the penetration depth of the disc opener(s) 102. As such, disengaging the depth control arm 124 from one of the apertures 128 and reengaging the depth control arm 124 with another aperture 128 may adjust the penetration depth of the disc opener(s) 102, such as by increasing or decreasing the penetration depth. In the embodiment shown in FIG. 5, the frame member 36 defines fourteen apertures 128. However, it should be appreciated that, in alternative embodiments, the frame member 36 may define more or less than fourteen apertures 128.

Figure 7:
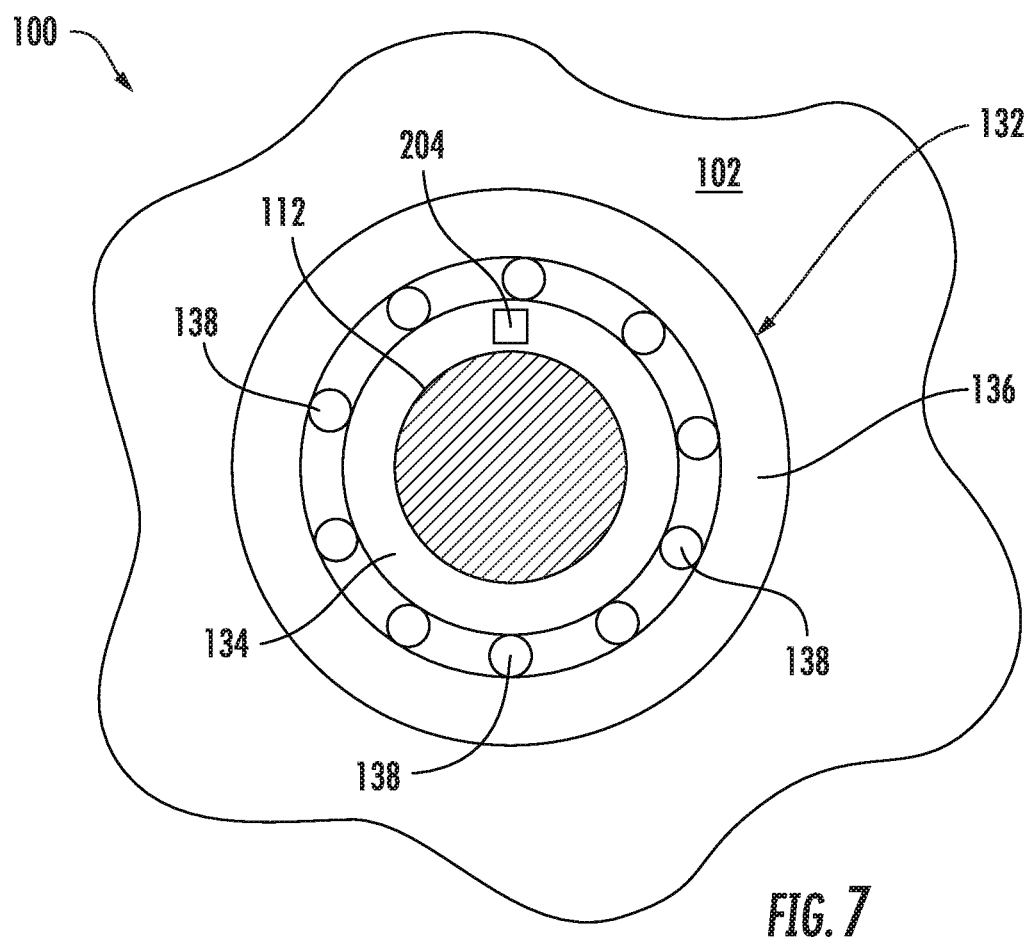
FIG. 7 illustrates another enlarged, partial side view of the furrow opening assembly shown in FIGS. 3 through 6, particularly illustrating a gauge wheel bearing configured to be coupled between the gauge wheel and a gauge wheel shaft in accordance with aspects of the present subject matter.

As mentioned above, the gauge wheel 106 may be rotatably mounted on the gauge wheel shaft 112. In this regard, as shown in FIG. 7, the depth adjustment assembly 104 may further include a gauge wheel bearing 132 positioned within the gauge wheel aperture 120 and coupled between the gauge wheel shaft 112 and the gauge wheel 106 to facilitate relative rotation therebetween. As is generally understood, the gauge wheel bearing 132 may include an inner race 134, an outer race 136 positioned around the inner race 134, and a plurality of rolling elements 138 (e.g., rollers, balls, cones, needles, etc.) positioned between the inner and outer races 134, 136. For example, as shown, in the illustrated embodiment, the inner race 134 may be in contact with or otherwise coupled to the rotor shaft 112 and the outer race 136 may be in contact with or otherwise coupled to the gauge wheel 106. In embodiments where the rotor shaft 112 corresponds to the fastener 122, the inner race 134 may be in contact with or otherwise coupled to the fastener 122. However, it should be appreciated that, in alternative embodiments, the gauge wheel bearing 132 may have any other suitable configuration.

Referring now to FIGS. 4, 6, and 7, in accordance with aspects of the present subject matter, one or more sensors 204 may be provided in operative association with one or more of the disc opener units 28, such as one or more components of furrow opening assembly 100. As will be described below, the sensor(s) 204 may be configured to detect a parameter indicative of the down pressure load(s) applied on the disc opener(s) 102. In this regard, it should be appreciated that the sensor(s) 204 may generally correspond to any suitable type of sensor configured to detect a parameter indicative of the down pressure load(s) applied on the disc opener(s) 102.

For example, as shown in FIG. 4, in one embodiment, the one or more sensors 204 may be provided in operative association with the gauge wheel 106. In such embodiment, the sensor(s) 204 may correspond to a strain gauge(s) configured to detect or measure a strain on the gauge wheel 106. Alternatively, the sensor(s) 204 may correspond to a torque transducer(s) configured to detect or measure a torque on the gauge wheel 106. Furthermore, the sensor(s) 204 may correspond to a load cell(s) configured to detect or measure a radial loading on the gauge wheel 106. It should be appreciated that, in alternative embodiments, the sensor(s) 204 may correspond to any suitable type of sensor(s) configured to detect or measure a parameter of the gauge wheel 106 indicative of the down pressure load(s) applied on the disc opener(s) 102.

In another embodiment, the one or more sensors 204 may be provided in operative association with the gauge wheel arm 110. In such embodiment, the sensor(s) 204 may correspond to a strain gauge configured to detect or measure a strain on the gauge wheel arm 110. Moreover, the sensor(s) 204 may correspond to a load cell configured to detect or measure a loading on the gauge wheel arm 110. It should be appreciated that, in alternative embodiments, the sensor(s) 204 may correspond to any suitable type of sensor(s) configured to detect or measure a parameter of the gauge wheel arm 110 indicative of the down pressure load(s) applied on the disc opener(s) 102.

In a further embodiment, the one or more sensors 204 may be provided in operative association with a component coupled between the gauge wheel 106 and the gauge wheel arm 110. In such embodiment, the sensor(s) 204 may correspond to a strain gauge(s) configured to detect or measure a strain on the gauge wheel shaft 112, the gauge wheel bearing 132, and/or the fastener 122. Moreover, the sensor(s) 204 may correspond to a torque transducer(s) configured to detect or measure a torque on the gauge wheel shaft 112, the gauge wheel bearing 132, and/or the fastener 122. Furthermore, the sensor(s) 204 may correspond to a load cell(s) configured to detect or measure a radial loading on the gauge wheel shaft 112, the gauge wheel bearing 132, and/or the fastener 122. For example, in such embodiment, as shown in FIG. 7, the one or more sensors 204 may be provided in operative association with the inner race 134 of the gauge wheel bearing 132. It should be appreciated that, in alternative embodiments, the sensor(s) 204 may correspond to any suitable type of sensor(s) configured to detect or measure a parameter of the gauge wheel shaft 112, the gauge wheel bearing 132, and/or the fastener 122 indicative of the down pressure load(s) applied on the disc opener(s) 102.

In yet another embodiment, the one or more sensors 204 may be provided in operative association with the spindle 108. In such embodiment, the sensor(s) 204 may correspond to a strain gauge configured to detect or measure a strain on the spindle 108. Moreover, the sensor(s) 204 may correspond to a torque transducer configured to detect or measure a torque on the spindle 108. Furthermore, the sensor(s) 204 may correspond to a load cell configured to detect or measure a radial loading on the spindle 108. It should be appreciated that, in alternative embodiments, the sensor(s) 204 may correspond to any suitable type of sensor(s) configured to detect or measure a parameter of the spindle 108 indicative of the down pressure load(s) applied on the disc opener(s) 102.

As shown in FIG. 6, in an even further embodiment, the one or more sensors 204 may be provided in operative association with the frame member 36. For example, in such embodiment, the one or more sensors 204 may be positioned within one or more of the apertures 128 defined by the frame member 36 such that the sensor(s) 204 are positioned between the frame member 36 and the portion of the depth control arm 124 (e.g., the tab 130) engaging the aperture 128. As such, the sensor(s) 204 may correspond to a pressure sensor(s) configured to detect a pressure exerted on the frame member 36 by the tab 130. Moreover, the sensor(s) 204 may correspond to a strain gauge configured to detect or measure a strain on the gauge frame member 36. Furthermore, the sensor(s) 204 may correspond to a load cell configured to detect or measure a loading on the frame member 36. It should be appreciated that, in alternative embodiments, the sensor(s) 204 may correspond to any suitable type of sensor(s) configured to detect or measure a parameter of the spindle 108 indicative of the down pressure load(s) applied on the disc opener(s) 102.

Figure 8:
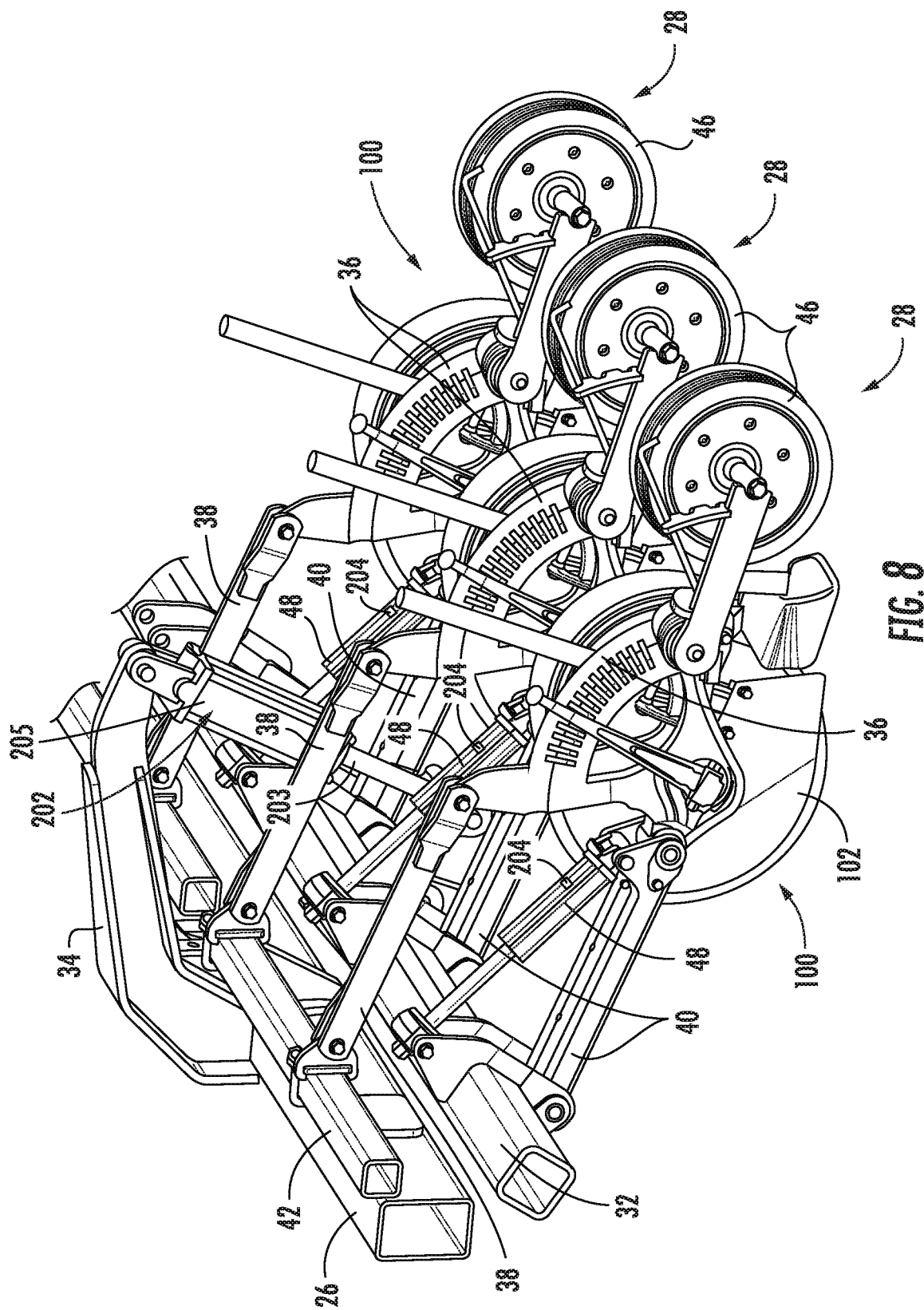
FIG. 8 illustrates an enlarged, partial perspective view of another embodiment of the seeder shown in FIG. 1, particularly illustrating a plurality of disc opener units coupled to a toolbar and a rockshaft of the seeder with a cylinder coupled between disc opener unit and the rockshaft in accordance with aspects of the present subject matter.

Referring now to FIG. 8, an enlarged, perspective view of a portion of another embodiment of the seeder 14 described above with reference to FIGS. 2 through 7 is illustrated in accordance with aspects of the present subject matter. As shown, the seeder 14 and the disc opener units 28 may generally be configured the same as or similar to that described above with reference to FIG. 2 through 7. For instance, the seeder 14 may include the plurality of disc opener units 28, with each disc opener unit 28 being coupled to the toolbar 26 and the rockshaft 32 by a corresponding upper and lower link 38, 40. Furthermore, a biasing member 46 may be coupled between each frame member 36 and the rockshaft 32. However, as shown in FIG. 8, unlike the above-described embodiment, each biasing member corresponds to a fluid-driven actuator 46, such as a hydraulic or pneumatic cylinder. In this respect, the fluid-driven actuator 46 may be configured to apply a down force or pressure through the frame member 36 and the various components coupled thereto. For example, each fluid-driven actuator 46 may be configured to adjust the down pressure applied to the disc opener(s) 102 of the corresponding disc opener unit 28. In such instances, the actuator 202 may only be used for raising and/or lowering the disc opener units 28 or eliminated from the seeder 14. It should be appreciated that, in alternate embodiments, the biasing member 46 may correspond to any other suitable biasing element.

Additionally, as shown in FIG. 8, the one or more sensors 204 may be provided in operative association with one or more of the fluid-driven cylinders 46. For example, in such embodiment, the one or more sensors 204 may be configured as pressure sensors provided in provided in operative association with the fluid-driven cylinder 46. In general, the pressure sensor(s) may be configured to detect or measure a pressure of a fluid supplied within the cylinder 46. For example, in one embodiment, the pressure sensor(s) may be provided in fluid communication with a fluid chamber defined within the cylinder 46 (e.g., a piston-side chamber or a rod-side chamber of the cylinder 46). Alternatively, the pressure sensor(s) may be installed at any other suitable location that allows the pressure sensor(s) to measure the pressure of the fluid supplied within the cylinder 46, such as by installing the pressure sensor in fluid communication with a hose or conduit configured to supply fluid to the cylinder 46. In a further embodiment, the sensor 204 may be provided in operative association with the actuator 202.

It should be appreciated that, in alternative embodiments, the one or more sensors 204 may be provided in operative association with any other suitable component(s) of the furrow opening assembly 100 and/or seeder 14. For example, the one or more sensor(s) 204 may correspond to a strain gauge(s) configured to detect a strain on the depth control arm 124.

It should also be appreciated that the configuration of the furrow opening assembly 100 described above and shown in FIGS. 3 through 7 is provided only to place the present subject matter in an exemplary field of use. Thus, it should be appreciated that the present subject matter may be readily adaptable to any manner of furrow opening assembly configuration.

Figure 9:
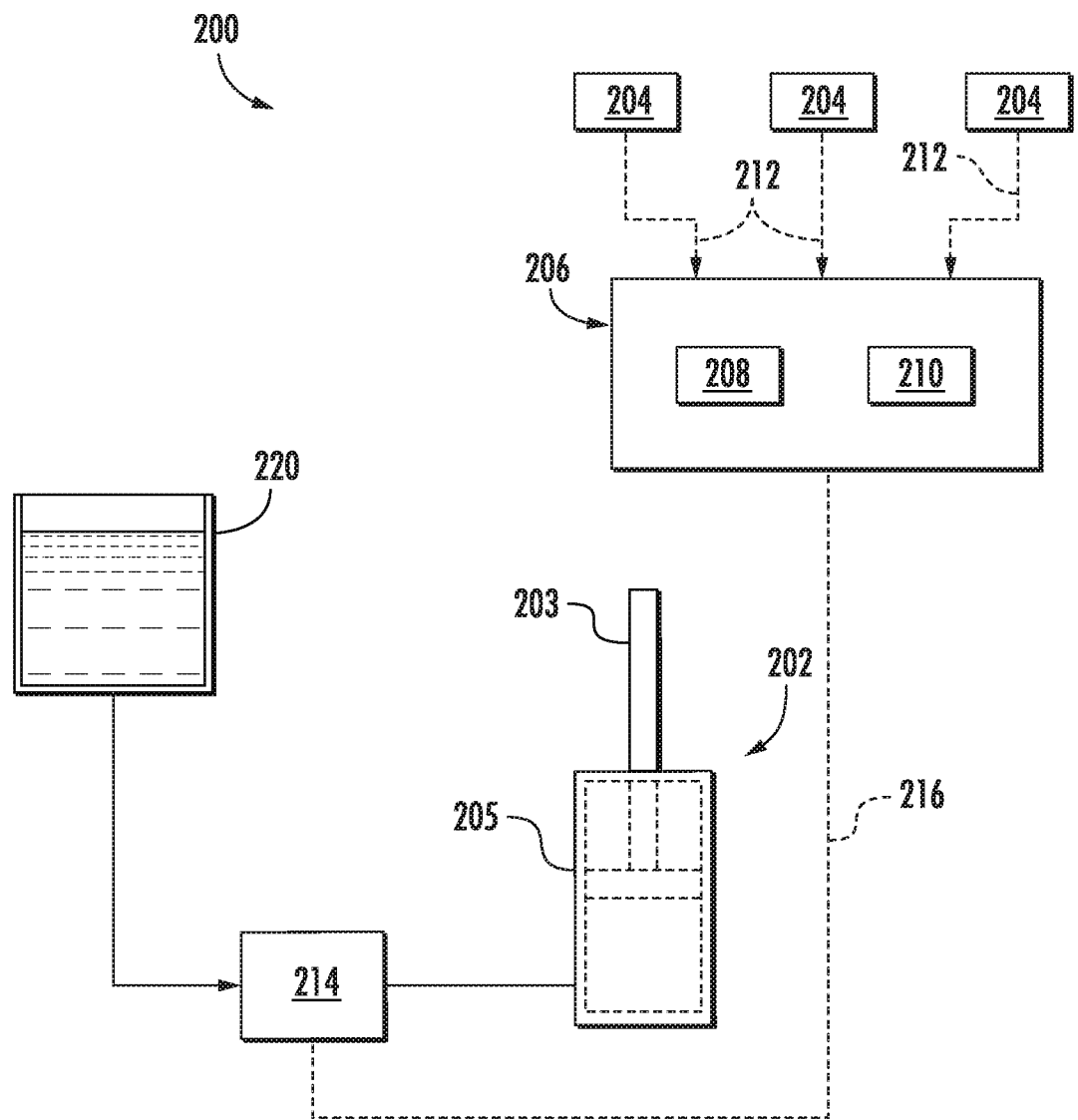
FIG. 9 illustrates a schematic view of one embodiment of a system for adjusting down pressure loads on a disc opener of a seeder in accordance with aspects of the present subject matter.

Referring now to FIG. 9, a schematic view of one embodiment of a system 200 for adjusting down pressure loads on a disc opener of a disc opener unit of a seeder is illustrated in accordance with aspects of the present subject matter. In general, the system 200 will be described herein with reference to the seeder 14, the disc opener unit 28, and the furrow opening assembly 100 described above with reference to FIGS. 1 through 7. However, it should be appreciated by those of ordinary skill in the art that the disclosed system 200 may generally be utilized with seeders having any other suitable seeder configuration, disc opener units having any other suitable disc opener configuration, and/or furrow opening assemblies having any other suitable opener assembly configuration.

In general, the system 200 may include one or more of the various components of the seeder 14 described above. For example, in several embodiments, the system 200 may include one or more sensors configured to detect a parameter indicative of the down pressure load(s) applied on the disc opener(s) 102, such as the sensor(s) 204 described above. In the embodiment shown in FIG. 9, the system 200 includes three sensors 204, with each sensor 204 being provided in operative association with a component(s) of one of the disc opener units 28 of the seeder 14 shown in FIG. 2. However, it should be appreciated that, in alternative embodiments, the system 200 may include any other suitable number of sensors 204. For example, the system 200 may include one sensor 204 provided in operative association with each disc opener unit 28, more than one sensor 204 provided in operative association with each disc opener unit 28, or one sensor 204 may be provided in operative association with only a portion of the disc opener units 28.

Additionally, the system 200 may also include an actuator configured to adjust the down pressure load being applied on the disc opener(s) 102, such as the rockshaft cylinder or actuator 202 of the seeder 14. In the embodiment shown in FIG. 9, the system 200 includes a single actuator 202, with such actuator 202 being configured to adjust the down pressure load applied on the disc opener(s) of each disc opener unit 28 ganged to the rockshaft 32 to which the actuator 202 is coupled (e.g., via the configuration shown in FIG. 2). However, it should be appreciated that, in alternative embodiments, the system 200 may include any other suitable number of actuators 202. For example, the system 200 may include one actuator 202 for each disc opener unit 28 such that each actuator 202 adjusts the down pressure load applied to the disc opener(s) 102 of one disc opener unit 28.

Moreover, the system 200 may include a controller 206 configured to electronically control the operation of one or more components of the seeder 14 and/or one or more components of the system 200. In general, the controller 206 may comprise any suitable processor-based device known in the art, such as a computing device or any suitable combination of computing devices. Thus, in several embodiments, the controller 206 may include one or more processor(s) 208 and associated memory device(s) 210 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 210 of the controller 206 may generally comprise memory element(s) including, but not limited to, a computer readable medium (e.g., random access memory (RAM)), a computer readable non-volatile medium (e.g., a flash memory), a floppy disc, a compact disc-read only memory (CD-ROM), a magneto-optical disc (MOD), a digital versatile disc (DVD), and/or other suitable memory elements. Such memory device(s) 210 may generally be configured to store suitable computer-readable instructions that, when implemented by the processor(s) 208, configure the controller 206 to perform various computer-implemented functions, such as one or more aspects of the method 300 described below with reference to FIG. 10. In addition, the controller 206 may also include various other suitable components, such as a communications circuit or module, one or more input/output channels, a data/control bus and/or the like.

It should be appreciated that the controller 206 may correspond to an existing controller the work vehicle 10 and/or the seeder 14, itself, or the controller 206 may correspond to a separate processing device. For instance, in one embodiment, the controller 206 may form all or part of a separate plug-in module that may be installed in association with the work vehicle 10 and/or the seeder 14 to allow for the disclosed systems and methods to be implemented without requiring additional software to be uploaded onto existing control devices of the seeder 14.

In several embodiments, the controller 206 may be configured to monitor the current down pressure load(s) being applied to the disc openers 102 of the seeder 14. Specifically, the controller 206 may be communicatively coupled to the sensors 204 via a wired or wireless connection to allow measurement signals (e.g., indicated by dashed lines 212 in FIG. 9) to be transmitted from the sensors 204 to the controller 206. The controller 206 may then be configured determine or estimate the current down pressure load(s) being applied to the disc openers 102 based on the measurement signals 212 received from the sensors 204. For instance, the controller 206 may include a look-up table or suitable mathematical formula stored within its memory 210 that correlates the sensor measurements to the down pressure load(s) being applied to the disc openers 102.

Additionally, in one embodiment, the controller 206 may be configured to monitor the down pressure load(s) being applied to the disc openers 102 relative to one or more desired down pressure ranges. For instance, upon receiving the measurement signals 212 from the sensors 204, the controller 206 may be configured to compare the monitored down pressure loads to a predetermined down pressure load range defined for the disc opener(s) 102. Thereafter, in the event that the monitored down pressure load(s) exceeds a maximum down pressure load threshold for the given down pressure load range or falls below a minimum down pressure load threshold for the given range (thereby indicating that the down pressure load(s) on the disc openers 102 may be too high or too low), the controller 206 may be configured to control the operation of the actuator 202 to adjust the down pressure load(s) on the disc openers 102. In particular, the controller 206 may control the operation of the actuator 202 to adjust the position of the rockshaft 32 relative to the toolbar 26 by extending or retracting the rod 203 of the actuator 202, thereby adjusting the down pressure being applied on the disc openers 102. For instance, the controller 206 may control the operation of the actuator 202 such that the rod 203 is retracted when the monitored down pressure load(s) exceeds the maximum down pressure load threshold to reduce the down pressure loads being applied on the disc openers 102. Similarly, the controller 206 may control the operation of the actuator 202 such that the rod 203 is extended when the monitored down pressure load(s) fall below the minimum down pressure load threshold to increase the down pressure load(s) being applied on the disc openers 102.

It should be appreciated that maintaining the down pressure load(s) applied to the disc opener(s) 102 within the down pressure range(s) may maintain a constant penetration depth of the disc openers 102 despite changing soil conditions (e.g., changes in soil hardness). For example, in some instances, the down pressure range may correspond to an operator selected down pressure range. In this regard, the operator may select a desired down pressure target and/or corresponding range based on the soil conditions that the seeder 14 is currently experiencing or expected to experience. Alternatively, the down pressure range may correspond to a manufacturer recommended down pressure range.

In an alternative embodiment, the controller 206 may not be configured determine or estimate the current down pressure load(s) being applied to the disc openers 102 based on the measurement signals 212 received from the sensors 204. Instead, the controller 206 may be configured to compare the monitored parameter value(s) received from the sensor(s) 204 to a predetermined range defined for the parameter. For example, in an embodiment where the sensor(s) 204 correspond to a pressure sensor(s) configured to detect a pressure(s) exerted on the frame member(s) 36 by the corresponding depth control arm(s) 124, the controller 206 may be configured to compare the monitored pressure value(s) to a predetermined pressure range. Thereafter, in the event that the monitored parameter value(s) exceeds a maximum value threshold for the given parameter range or falls below a minimum down pressure load threshold for the given range (thereby indicating that the down pressure load(s) on the disc openers 102 may be too high or too low), the controller 206 may be configured to control the operation of the actuator 202 to adjust the down pressure load(s) on the disc openers 102 as described above.

Moreover, as shown in FIG. 9, the controller 206 may be configured to receive the measurement signals 212 from multiple sensors 204. For example, in one embodiment, the controller 206 may be configured to compare the individual monitored parameter values received from the various sensor(s) 204 or associated down pressure loads to determine an instantaneous or current maximum or minimum parameter value or down pressure load. In such an embodiment, the controller 206 may be configured to compare the maximum or minimum parameter value or down pressure load to the corresponding predetermined range. In another embodiment, the controller 206 may be configured to calculate an instantaneous or current average parameter value or down pressure load from the individual monitored parameter values received from the various sensor(s) 204 or associated down pressure loads. In such an embodiment, the controller 206 may be configured to compare the average parameter value or down pressure load to the corresponding predetermined range. However, it should be appreciated that, in alternative embodiments, the controller 206 may be configured to identify or determine any other suitable statistical value associated with the measured parameter values or associated downs pressure loads and compare such statistical value to a corresponding range.

In accordance with aspects of the present disclosure, the controller 206 may be configured to control the operation of the actuator 202 by actively controlling the operation of an associated valve(s) 214, such as one or more pressure regulating valves (PRVs). For instance, in the illustrated embodiment, the controller 206 is communicatively coupled to the valve(s) 214 (e.g., as indicated by dashed line 216) such that the controller 206 may control the operation of the valve(s) 214 in a manner that regulates the pressure of the hydraulic fluid supplied to of the actuator 202 from a corresponding reservoir 202. In such an embodiment, the pressure of the fluid supplied from the valve 214 may be directly proportional to the amount of extension/retraction of the actuator 202, thereby allowing the controller 206 to control the displacement of the actuator 202. It should be appreciated that, in alternate embodiments, the controller 206 may be configured to be coupled to any other suitable component(s) for automatically controlling the operation of the actuator 202.

Figure 10:
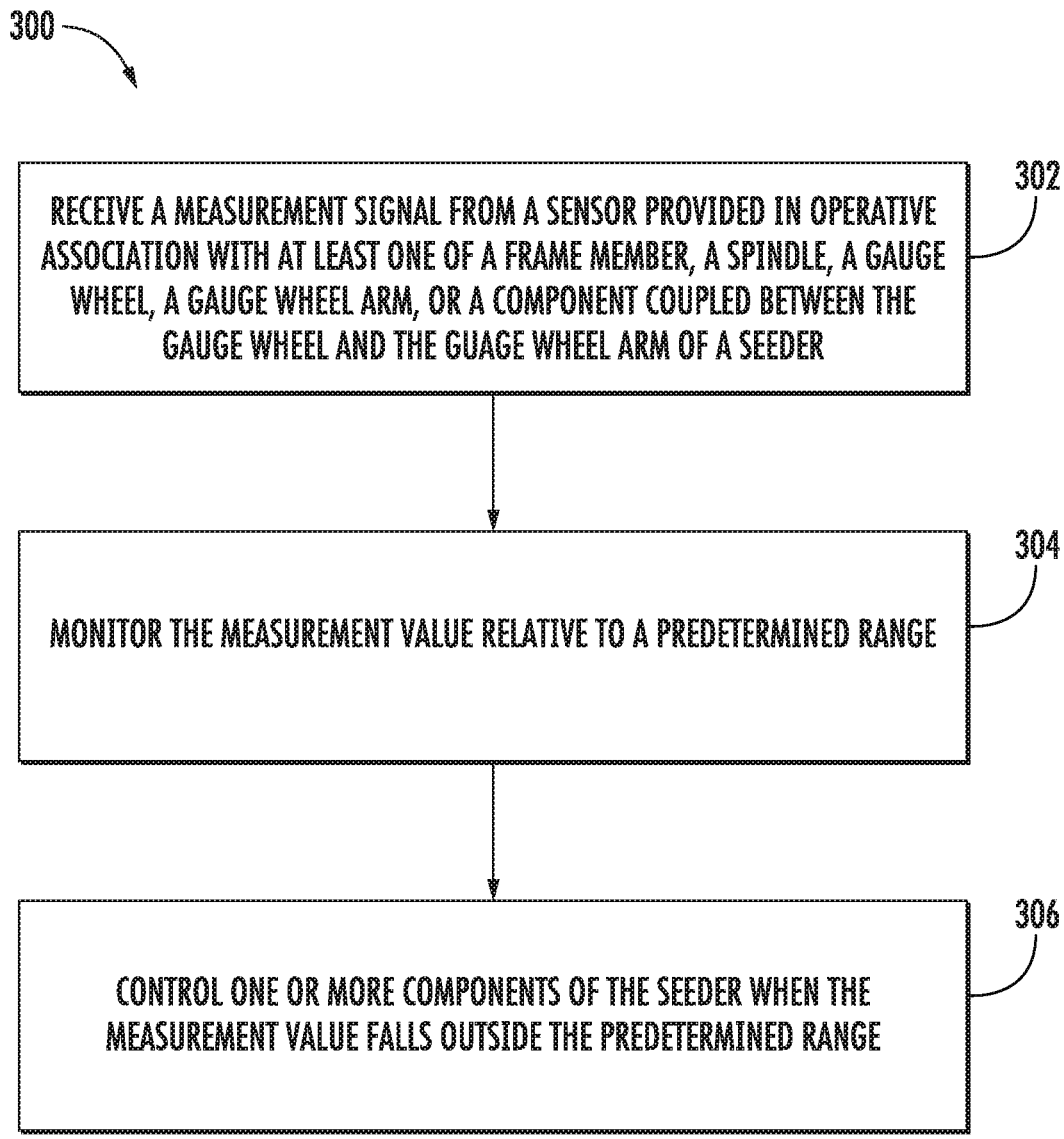
FIG. 10 is a flow diagram of a method for adjusting down pressure loads on a disc opener of a seeder in accordance with aspects of the present subject matter.

Referring now to FIG. 10, a flow diagram of one embodiment of a method 300 for adjusting down pressure loads on a disc opener of a disc opener unit of a seeder is illustrated in accordance with aspects of the present subject matter. In general, the method 300 will be described herein with reference to the seeder 14, the disc opener units 26, the furrow opening assembly 100, and the system 200 described above with reference to FIGS. 1-8. However, it should be appreciated by those of ordinary skill in the art that the disclosed method 300 may generally be utilized to adjust the down pressure loads on disc openers of disc opener units of seeders having any other suitable seeder configuration, disc opener units having any other suitable unit configuration, and/or furrow opening assemblies having any other suitable opener assembly configuration. In addition, although FIG. 10 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 10, at (302), the method 300 may include receiving a measurement signal from a sensor provided in operative association with at least one of a frame member, a spindle, a gauge wheel, a gauge wheel arm, or a component coupled between the gauge wheel and the gauge wheel arm of a seeder. For instance, as indicated above, the controller 206 may be communicatively coupled to one or more sensors 204. Such sensor(s) 204 may be provided in operative association with the frame member 36, the spindle 108, the gauge wheel 106, the gauge wheel arm 110, or a component coupled between the gauge wheel 106 and the gauge wheel arm 110 (e.g., the gauge wheel bearing 132, the gauge wheel shaft 112, and/or the fastener 122) of a seeder 14. As such, measurement signals 212 transmitted from the sensor(s) 204 may be received by the controller 206 for subsequent processing of the associated operating parameter measurements.

Additionally, at (304), the method 300 may include monitoring the measurement value relative to a predetermined range. Specifically, as indicated above, the controller 206 may be configured to compare received measurement or parameter values or associated down pressure loads on the disc opener(s) 102 to one or more predetermined ranges.

Moreover, as shown in FIG. 10, at (306), the method 300 may include controlling one or more components of the seeder when the measurement value falls outside the predetermined range. For instance, as indicated above, the controller 206 may, in one embodiment, be configured to control the operation of the actuator 202 (e.g., via the valve 214) to adjust the relative positioning between the rockshaft 32 and the toolbar 26, thereby adjusting the down pressure loads on the disc opener(s) 102.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for adjusting down pressure loads on a disc opener of a seeder, the system comprising:
    a frame member;
    a disc opener supported on the frame member for rotation relative thereto, the disc opener being configured to penetrate the ground to form a furrow;
    a depth adjustment assembly including a gauge wheel and a gauge wheel arm coupled between the disc opener and the gauge wheel, the depth adjustment assembly being configured to control a penetration depth of the disc opener;
    an actuator configured to apply a down pressure load on the disc opener;
    a sensor mounted on the gauge wheel or on a component coupled between the gauge wheel and the gauge wheel arm, the sensor being configured to detect a parameter indicative of the down pressure load applied on the disc opener; and
    a controller communicatively coupled to the sensor, the controller being configured to control an operation of the actuator based on measurement signals received from the sensor to regulate the down pressure load applied on the disc opener.

2. The system of claim 1, wherein the component is a wheel bearing provided in association with the gauge wheel.

3. The system of claim 1, wherein the component is a shaft coupled between the gauge wheel and the gauge wheel arm.

4. The system of claim 3, wherein the shaft comprises a fastener provided in association with the gauge wheel.

5. The system of claim 1, wherein, when the detected parameter exceeds a maximum threshold, the controller is configured to control the operation of the actuator such that the down pressure load on the disc opener is reduced.

6. The system of claim 1, wherein, when the detected parameter falls below a minimum threshold, the controller is configured to control the operation of the actuator such that the down pressure load on the disc opener is increased.

7. The system of claim 1, wherein the sensor is a strain gauge or a load cell.

8. A system for adjusting down pressure loads on a disc opener of a seeder, the system comprising:
    a frame member;
    a disc opener supported on the frame member for rotation relative thereto, the disc opener being configured to penetrate the ground to form a furrow;
    a depth adjustment assembly configured to control a penetration depth of the disc opener, the depth adjustment assembly including a gauge wheel and a depth control arm coupled to the gauge wheel, the depth adjustment arm being moveable relative to the frame member;
    an actuator configured to apply a down pressure load on the disc opener;
    a sensor provided in operative association with the frame member, the sensor positioned between the depth control arm and the frame member and being configured to detect a parameter indicative of the down pressure load applied on the disc opener; and
    a controller communicatively coupled to the sensor, the controller being configured to control an operation of the actuator based on measurement signals received from the sensor to regulate the down pressure load applied on the disc opener.

9. The system of claim 8, wherein the frame member defines a plurality of apertures, each aperture being associated with a predetermined penetration depth of the disc opener, the depth adjustment assembly further comprising:
    a gauge wheel arm coupled to the gauge wheel; and
    a spindle coupled between the depth control arm and the gauge wheel arm, a portion of the depth control arm being configured to engage one of the plurality of apertures defined by the frame member to set the penetration depth of the disc opener;
    wherein the sensor is positioned within one of the apertures defined within the frame member such that the sensor is positioned between the frame member and the portion of the depth control arm engaging the aperture.

10. The system of claim 8, wherein, when the detected parameter exceeds a maximum threshold, the controller is configured to control the operation of the actuator such that the down pressure load on the disc opener is reduced.

11. The system of claim 8, wherein, when the detected parameter falls below a minimum threshold, the controller is configured to control the operation of the actuator such that the down pressure load on the disc opener is increased.

12. The system of claim 8, wherein the sensor comprises a strain gauge or a load cell.

13. A seeder, comprising:
    a toolbar;
    a rockshaft moveable relative to the toolbar;
    an actuator coupled between the toolbar and the rockshaft, the actuator being configured to move the rockshaft relative to the toolbar;
    a plurality of disc opener units adjustably coupled to the toolbar and the rockshaft, each disc opener unit comprising:
        a frame member coupled to the toolbar and the rockshaft;
        a disc opener supported on the frame member for rotation relative thereto, the disc opener being configured to penetrate the ground to form a furrow;
        a depth adjustment assembly including a gauge wheel and a gauge wheel arm coupled between the disc opener and the gauge wheel, the depth adjustment assembly being configured to control a penetration depth of the disc opener;
    a plurality of sensors, each sensor being mounted directly to at least one of the frame member, the gauge wheel, or a component coupled between the gauge wheel and the gauge wheel arm of one of the disc opener units, the sensor being configured to detect a parameter indicative of the down pressure load applied to the corresponding disc opener; and
    a controller communicatively coupled to the plurality of sensors, the controller being configured to control an operation of the actuator based on measurement signals received from the plurality of sensors to adjust the position of the rockshaft relative to the toolbar to regulate the down pressure load being applied on the disc opener of each disc opener unit.

14. The seeder of claim 13, wherein each component is a wheel bearing provided in association with the corresponding gauge wheel.

15. The seeder of claim 13, wherein each component is a shaft coupled between the corresponding gauge wheel and the corresponding gauge wheel arm.

16. The seeder of claim 15, wherein each shaft comprises a fastener provided in association with the corresponding gauge wheel.

17. The seeder of claim 13, wherein each frame member defines a plurality of apertures, each aperture being associated with a predetermined penetration depth of the disc opener, each depth adjustment assembly further comprising:
- a spindle coupled to the corresponding gauge wheel arm; and
- a depth control arm coupled to the corresponding spindle, a portion of the corresponding depth control arm being configured to engage one of the plurality of apertures defined by the corresponding frame member to set the penetration depth of the corresponding disc opener wherein at least one of the plurality of sensors is positioned within one of the apertures defined within the frame member such that the sensor is positioned between the frame member and the portion of the depth control arm engaging the aperture.

18. The seeder of claim 17, wherein each sensor is positioned between the depth control arm of one of the disc opener units and the corresponding frame member.

19. The seeder of claim 13, wherein the controller is further configured to:
- control the operation of the actuator such that the down pressure load on each disc opener is reduced when the detected parameters exceed a maximum threshold; and
- control the operation of the actuator such that the down pressure load on each disc opener is increased when the detected parameters fall below a minimum threshold.

* * * * *